United States Patent [19]

Ware et al.

[11] 4,030,702

[45] June 21, 1977

[54] APPARATUS AND METHOD FOR PNEUMATICALLY RODDING MULTI-PASSAGE CABLE HOUSING CONDUITS

[75] Inventors: William P. Ware, Charlotte, N.C.; Robert D. Wheeler, Rock Hill, S.C.

[73] Assignee: Thomas Industries of Tennessee, Inc., Matthews, N.C.

[22] Filed: Aug. 26, 1976

[21] Appl. No.: 718,013

[52] U.S. Cl. .......................................... 254/134.4
[51] Int. Cl.² ...................................... B65H 59/00
[58] Field of Search ............... 254/134.4, 134.3 FT, 254/134.3 R; 15/104.06 R

[56] References Cited

UNITED STATES PATENTS

| | | | |
|---|---|---|---|
| 1,851,435 | 3/1932 | Jessup | 254/134.4 |
| 2,188,959 | 2/1940 | Schaer | 15/104.06 |
| 2,515,953 | 7/1950 | Dufresne | 254/134.4 |
| 2,661,187 | 12/1953 | Dailey | 254/134.3 FT |
| 3,244,403 | 4/1966 | Ensley | 254/134.4 |
| 3,363,879 | 1/1968 | Irik | 254/134.3 FT |

*Primary Examiner*—Al Lawrence Smith
*Assistant Examiner*—Robert C. Watson
*Attorney, Agent, or Firm*—Johnson, Dienner, Emrich & Wagner

[57] ABSTRACT

Cable pull lines are pneumatically rodded through underground cable housing conduit comprising joined multipassage sections by attaching the free end of the pull lines to individual foam carriers inserted into each passage at one end of the conduit and forcing air through a manifold into said passages behind the foam carriers to simultaneously drive the carriers to the open exit end of the conduit. The pull lines have been previously uniformly wound on a reel and a brake is used to tension the reel as the pull lines unwind therefrom to keep the foam carriers in phase as they advance through the conduit and thereby to prevent air bypassing the leading foam carriers through gaps at the conduit section joints with resultant loss of driving pressure.

14 Claims, 12 Drawing Figures

U.S. Patent June 21, 1977 Sheet 1 of 3 4,030,702
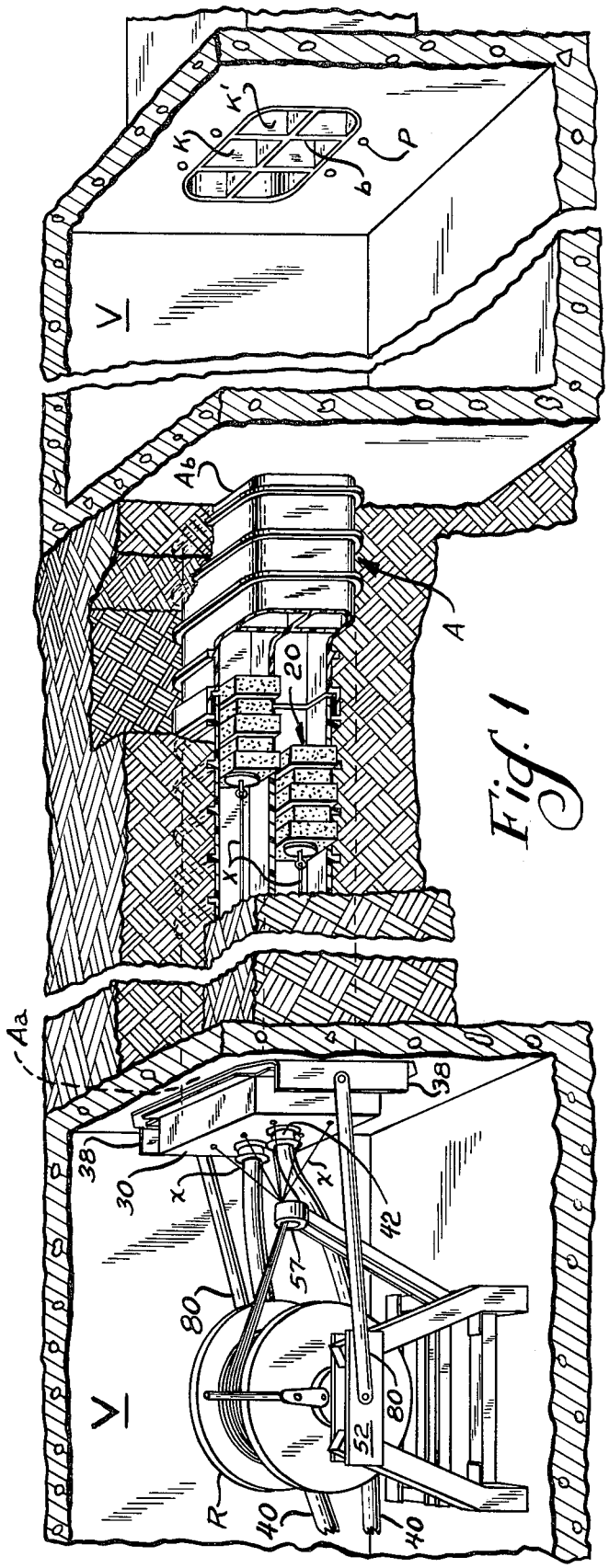
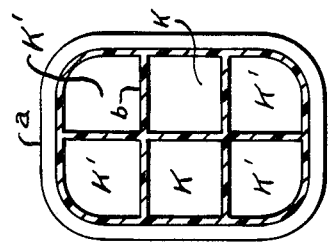
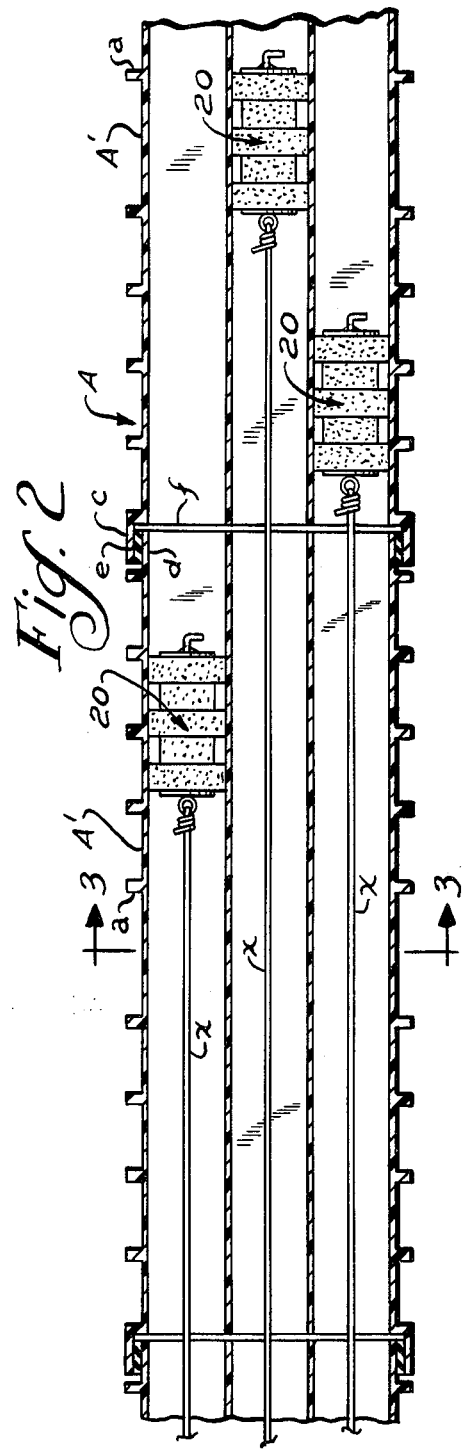

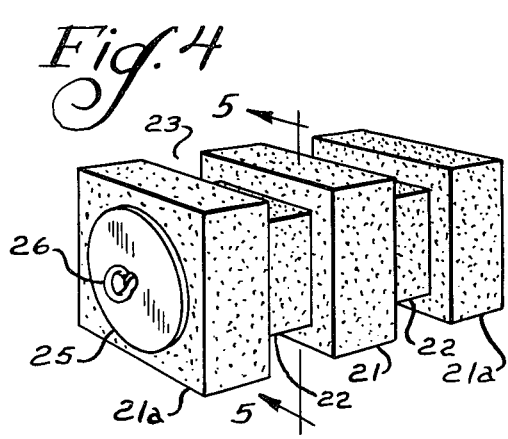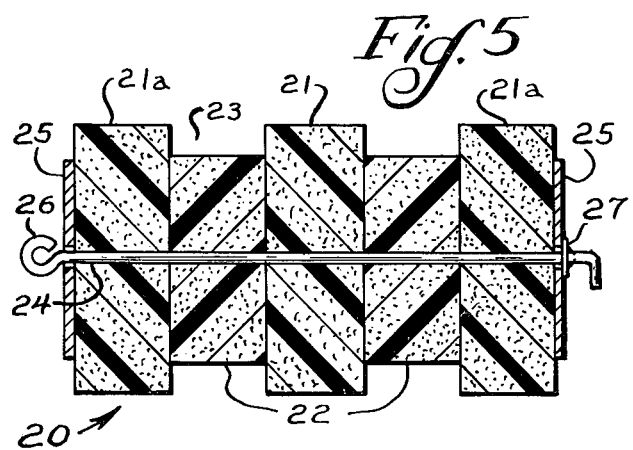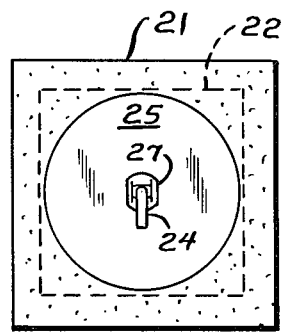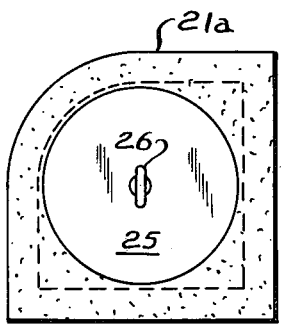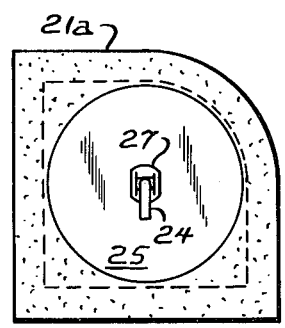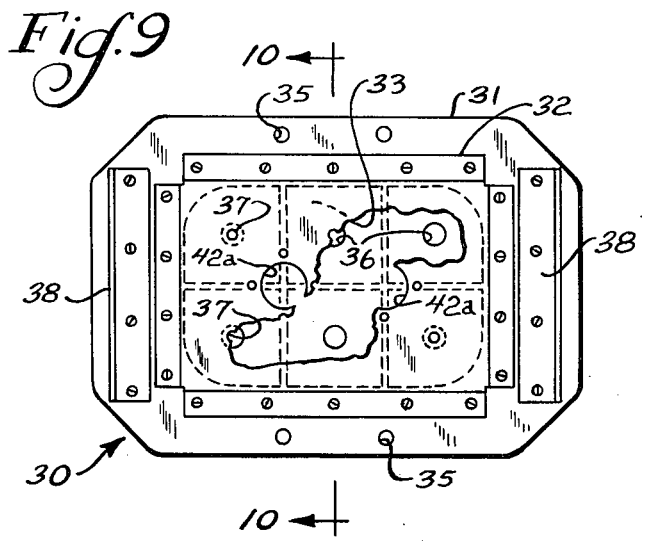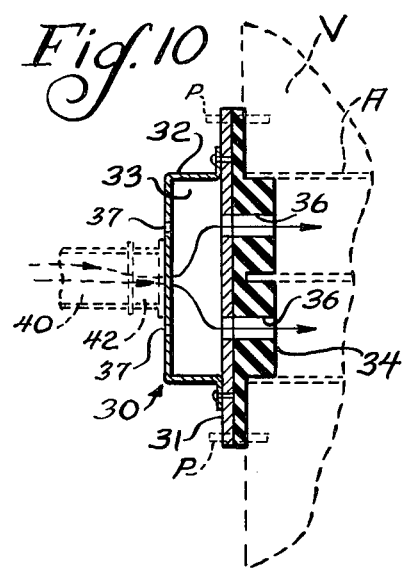

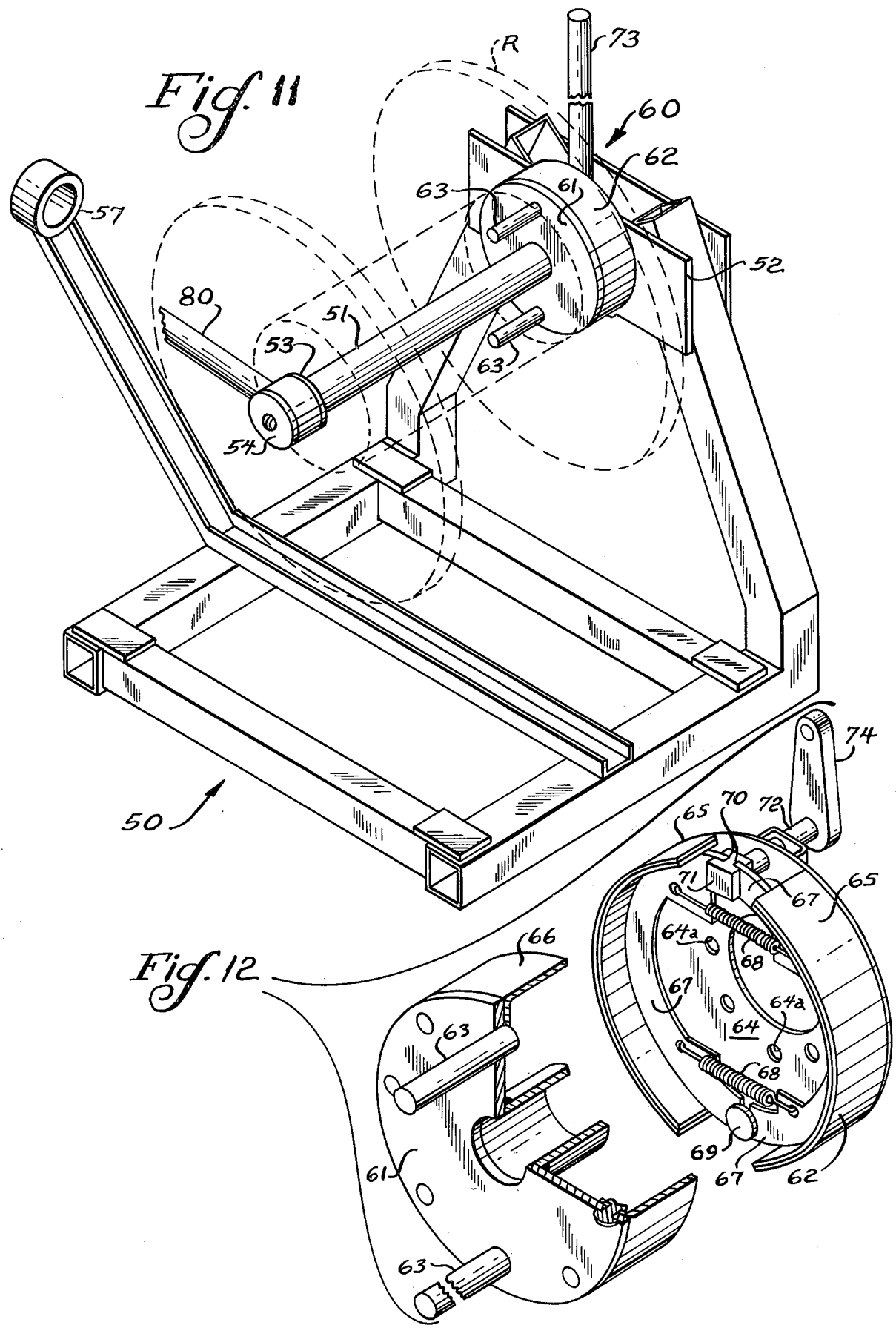

APPARATUS AND METHOD FOR PNEUMATICALLY RODDING MULTI-PASSAGE CABLE HOUSING CONDUITS

This invention relates to novel means and method of pneumatically rodding cable pull lines and the like through cable housing conduit.

It has been common practice to install telephone cable lines and the like in underground buried conduits. Conventionally, these conduits have comprised long lengths of pipe which are laid either singly or plurally side by side, are encased in concrete or otherwise made air tight where they join together and are terminated at either end in a manhole or equivalent area allowing access to the two open ends of the buried conduit. Various methods have been devised for feeding the cable through the conduit. Commonly, this has been accomplished as disclosed in U.S. Pat. Nos. issued to Jessup 1,851,435, Riley 3,091,433, Bitter 3,119,600, Corsiglia 3,301,531 and Ruddick et al., 3,689,031 by attaching one end of a cord or pull line to a light weight carrier or piston which is propelled through the conduit utilizing a blower or suction source located at one end of the conduit which creates a pressure differential in the conduit to effectively drive the carrier and its attached pull line through the conduit. The pull line then is available to pull the heavier cable through the conduit.

More recently, it has been proposed to utilize relatively short conduit sections which are injection-molded of high impact foam plastic such as linear polyethelene. These conduit sections are rugged, yet light in weight, and have bell and spigot shaped interfitting ends which permit the conduit sections to be quickly assembled and easily installed in the field. The spigot end of each section has a neoprene ribbed gasket which effectively seals the joint when the bell end of one section is fitted over the spigot end of a second conduit section. In molding the conduit sections, they are provided with soil anchoring ribs on their exterior and are interiorly partitioned lengthwise into six or nine passages which are equi-dimensioned and generally square in cross section. These partitions impart structural rigidity to the conduit sections while also providing separated passageways or ducts through the length of the assembled sections to permit separated housing of a corresponding number of cables.

Although the joints of the assembled conduit sections are sealed about the perimeter, air gaps remain between the ends of the partition walls of adjoining conduit sections. Attempts to separately thread pull lines through the individual passages using a single carrier or piston has not been found practical. Even when the passages not being rodded are sealed at both ends of the assembled conduit, the gaps which exist between passages at the joints of the conduit sections permit air to bypass the carrier and exit through the open end of the passage in which the carrier is located such that it is difficult if not impossible to develop sufficient driving pressure to propel the carrier and its attached pull line through the conduit. Alternatively, if carrier are inserted into each of the passages and simultaneously driven therethrough, loss of driving pressure will also occur if one or more of the carrier is temporarily halted upon meeting an obstruction or for any reason moves at a different rate of advancement and so leads or lags the remaining carriers.

Therefore a principal object of the invention is to provide means and method for pneumatically rodding cable pull lines through such multi-passage conduits which will overcome the aforeside problems.

In accordance with this invention, the exit end of the assembled conduit sections is left open and the entrant end into which the carriers with their attached pull lines is inserted, is closed off by a manifold through which air is introduced under pressure to the individual passages behind the carriers and the pull lines are uniformly tensioned by retarding reel rotation so that the carriers move in unison at the same rate through their respective passages to the exit end of the conduit and therefor remain in phase.

In a preferred embodiment of the invention, the pull lines are uniformly wound side by side on a reel while maintaining an even tension and a uniform spiral pitch; the reel is rotatably mounted on a stand; means are provided for rigidly fixing the rotational axis of the reel at a finite distance from the manifold; and the rotation of the reel is manually braked to assert sufficient resisting tension on the unwinding pull lines as the carriers are driven through the respective passages of the assembled conduit.

A feature of the invention is the novel construction of carriers employed for pulling the cable pull lines through the conduit passages under the driving force of the air fed to the entering end of the conduit closed by the manifold.

A further feature is the novel means employed for rotatably supporting the reel on which the pull lines are wound and braking the reel rotation while retaining the rotational axis of the reel at a fixed finit distance from the manifold so as to maintain the carriers in phase as they are propelled through the several passages of the conduit.

Still another feature of the invention is the novel manifold employed which in cooperation with the reel supporting and braking means for the pull lines assures positive advance of the pull lines as they are pneumatically rodded through the conduit.

Further features, objects and advantages of the invention include the economy afforded and convenience as well as speed of operation achieved in pneumatically rodding a plurality of pull lines through a multi-passage conduit embodying incompletely sealed conduit sections as aforedescribed.

Still other features, objects and advantages of the invention will be at once apparent, or will become so, upon consideration of the embodiment of the invention which now will be described in connection with the accompanying drawings.

Referring therefore now to said drawings, which illustrate a first and preferred embodiment of the invention, FIG. 1 is a somewhat diagrammatic view illustrating an underground buried conduit embodying joined multi-passage conduit sections terminating at manholes, one of which contains the air manifold and the reel supporting and braking means for the pull lines which are attached to foam carriers to be propelled through the multi-passage conduit;

FIG. 2 is a fragmented longitudinal sectional view taken through a portion of the multi-passage conduit of FIG. 1 and shows the carriers in an undesired out of phase relation;

FIG. 3 is a cross sectional view through the conduit taken along lines 3—3 of FIG. 2 looking in the direction indicated by the arrows;

FIG. 4 is a perspective view of a preferred construction of foam carrier in accordance with the invention;

FIG. 5 is a longitudinal sectional view through the foam carrier of FIG. 1 taken along lines 5—5 therein;

FIG. 6 is a view of the end of the foam carrier not visible in FIG. 4;

FIGS. 7 and 8 are views of the opposed ends of a second form of foam carrier, said carrier being constructed as in FIG. 4 but with a rounded corner allowing it to fit within the corner passages of the conduit as seen in FIG. 3;

FIG. 9 is a plan view of the manifold illustrated in position closing the entrant end of the conduit shown by broken lines, and the outer wall of the manifold being partially fragmented to illustrated details in its construction;

FIG. 10 is a sectional view through the manifold taken along lines 10—10 in FIG. 9, looking in the direction indicated by the arrows;

FIG. 11 is a view of the stand which supports the reel on which the cable pull lines are wound, the reel being shown in broken lines; and FIG. 12 is an exploded view illustrating details of the reel braking mechanism.

Referring now more particularly to the several views wherein like parts are identified by like reference numerals, FIG. 1 illustrates at A a multi-passage conduit for housing telephone cable lines and the like with which the present invention in method and apparatus for pneumatically rodding cable pull lines has particular utility. Conduit A which may be several hundred feet long is illustrated as buried below ground and its two ends terminating in an entrant end A$a$ and an exit end A$b$ communicating through openings into manholes or vaults V. Considering also FIGS. 2 and 3 therewith, conduit A is illustrated as comprising a plurality of conduit sections A' having their ends in telescoped interfitting sealed relation. Each said conduit sections is injection molded of high impact plastic foam such as linear polyethelene, and each has lateral ribs $a$ about its exterior which acts as soil anchors, helping to hold the conduit sections in their illustrated assembled relation. The interior of the conduit sections is divided by integral partitioning walls $b$ into equi-dimensional, generally square-shaped longitudinally extending cable receiving passages $k$, said partitions also adding rigidity and strength to the conduit section. One end of each conduit section has a flanged portion $c$ into which the opposite appropriately shaped end $d$ of a second conduit section is telescoped. Said opposite end $d$, is illustrated as provided with a ribbed neoprene gasket $e$ fixed thereabout so as to obtain an effectively silt-free joint between the conduit sections when flanged end $c$ receives end $d$. Thus, it will be understood that each conduit section A' has a flanged end $c$ sometimes referred to as a bell and a second gasket-provided receiving end $d$ sometimes identified as a spigot end. In one commercially available form, such conduit sections have a length of approximately 42 inches and a weight of about one pound per foot length. Conduit sections of such weight and dimensions are easy to handle and can be quickly installed either on or off the job site with a minimum work crew often as rapidly as the trench can be opened. In the illustrated form, partition walls $b$ divide the interior of each conduit section A' into six passages $k$ of generally square cross section, the four corner passages $k'$, however, each having one rounded corner by reason of the cross sectional shape of the conduit. For a more complete description of said conduit sections and their manner of assembly, reference may be had to U.S. Pat. Nos. 3,545,493 and 3,792,878 issued to Jerry H. Freeman.

Each of said passages $k$, when the conduit sections are assembled, constitute a housing in which one or more telephone cables or the like can be installed in isolation from other cables. Such cables are commonly installed using pull lines which have been threaded through each conduit passage from one manhole to the next.

In accordance with this invention, lengths of pull lines $x$ corresponding in number to the number of passages $k$ through the conduit are uniformly wound on a reel R under tension in close side-by-side relation at a uniform spiral pitch. Reel R is located in one manhole or vault V and the free ends of said pull lines $x$ after threading through manifold 30 later to be described, are attached to carriers 20 which are then inserted into the entrant end of each of the conduit passages $k$ and simultaneously advanced through the length of the conduit by blowing air through said manifold 30 into the entrant end of the conduit to draw the pull lines off the reel and through the conduit to the conduit exit end located in the next manhole.

Considering now FIGS. 9 and 10 with FIG. 1, it will understood that exit end A$b$ of the conduit is left open. However, the entrant end A$a$ of the conduit is closed by a manifold 30 comprising a mounting plate 31 having a box-shaped flanged member 32 bolted thereto to define with said plate 31 an air chamber 33 into which blower lines 40 detachably connect through provided fixtures 42. On the exterior side of mounting plate 31 and so as to engage the entrant end A$a$ of the conduit and also the surrounding wall of the manhole in which reel R is located is provided a resilient gasket 34 to assure an air tight seal of the manifold 30 to the entrant end of the conduit A. The assembled manifold 30 and its gasket 34 is fixed either to the surrounding wall of the manhole or directly to entrant conduit section itself. Any suitable means may be employed for this purpose. But, for example, either the entrant conduit section or the manhole wall about the conduit receiving opening therein may be provided with projecting pins P (FIG. 1) which are spaced to extend through appropriately located holes 35 in both the manifold mounting plate 31 and its gasket 34, said pins P being appropriately threaded to receive locking nuts or the like. As illustrated best in FIGS. 9 and 10, the manifold mounting plate 31 and its gasket 34 have aligned openings 36 through which air entering the manifold chamber from blower lines 40 may be directed into the entrant end of the conduit passages $k$. The outer manifold chamber defining member 32 also has smaller sized openings 37 which align with each of said larger opening 36 through which the pull lines $x$ attached to the carriers 20 feed into the respective passages $k$ as the carriers are drawn therethrough.

Although carriers 20 may be constructed of any suitable material and desired shape, such carriers preferably comprise a sandwich or assembly of sheet-like portions 21, 22, said portions are composed of plastic foam sheet material such as polyurethane having a density of 2 pounds per cubic foot. As illustrated best by FIGS. 4 and 5, alternate ones 21 of said carrier portions and at least the outer portions 21$a$, will have a cross sectional size and shape corresponding to the cross sectional size and shape of the respective conduit passages *k* through which they are advanced so as to remain in frictional sealing contact therewith. Thus, in the illustrated embodiment, foam carriers 21, 22 are generally square in cross section although one corner of those portions to be inserted into corner passages *k'* will be generally rounded. FIGS. 7 and 8 illustrate the shape of portions 21, 22 which are to be inserted into the passages *k'* and FIGS. 4, 6 illustrate the shape of those carriers to be inserted into the generally square shaped passages *k"*. As previously mentioned, carrier portions 21 have a cross sectional size as well as shape corresponding to that of the passages. The intervening carrier portions 22 although of the same cross section shape, are preferably, slightly smaller size in cross section so that they do not engage the passage walls, but provide clearance areas thereabout to receive dirt and other refuse swept by the carrier portions 21 of larger cross section size. Said clearance spaces 23 also provide space in which the larger sized carrier portions 21 may yield in passing obstructions in the passages which resist movement with the carriers. The assembly or sandwich of sheet foam plastic portions 21 and 22 may be secured together in a suitable fashion; however, as illustrated, are preferably closely clamped by means of a connector element 24 which is passed therethrough and provided end washers 25 overlying the outer ends of the sandwich. Connector 24 preferably has an eye shape portion 26 at one end to which a pull line *x* may be tied, and its opposite end is provided with a friction engaging locking member 27 which completes the assembly.

One of the problems involved in advancing the carriers 20 through the respective passages *k* of the conduit A is the necessity to keep the carriers 20 in lapping relation. This is because the partition walls *b* of the joined conduit sections A' do not always abut the partition walls of the adjoining conduit section to provide an air tight seal therewith but terminate short thereof so that the individual conduit passages *k* are incompletely sealed from each other. In fact, air gaps as great as 0.5 inches are often present at the conduit section joints. Of consequence, although the carriers 20 are designed of a size and shape to have a sliding fricitional fit with the partition walls defining the respective passages in which each carrier is advanced, if one or more of the carriers is permitted to lag the other carriers, on air gap *f* at the conduit section joint in the intervening separation of the carriers will permit air to bypass the leading carriers 20 to the open exit end A*b* of the conduit A with resultant loss of driving pressure and eventual halt of the carriers advance.

However, it is an important feature of this invention that means are provided which assure that the carriers 20 remain in phase and advance in unison through the full length of the conduit. Considering now FIGS. 11 and 12 with FIG. 1, reel R on which pull lines *x* are wound is shown rotatably supported on axle 51 of a reel supporting stand indicated generally at 50. Fixed at one end of said reel axle 51 is a reel braking mechanism illustrating generally at 60 and comprising two telescoping brake elements 61, 62. Brake elements 62 includes a mounting disk 64 which is bolted through openings 64a to an upstanding portion 52 of stand 50 and to which the adjacent end of axle 51 is also rigidly fixed. Freely rotatable relative to the first brake element 62 is a second brake element 61 having axially-extending pins 63 which interfit within provided openings in the adjacent side of the reel R as when the reel is slid over the opposite end of the axle 51 and aligned to receive said pins 63. At 53, axle 51 is provided with a washer removably held in place by a keeper 54 for locking reel R to brake element 61 while permitting it freedom to rotate on axle 51. At 80 are a pair of locating struts each having one end detachably connected to mounting portions 38 on opposite sides of manifold 30. One of said locating struts 80 has its opposed end pivotally connected to portion 52 of the reel stand 50, said connection being concentric with axle 51. The other strut has its opposed end provided with an opening by which it removably seats about said free end of the axle 51 between the aforementioned washer 53 and keeper 54. Struts 80 thus serve to locate stand 50 and its reel axle 51 at a fixed finite distance from manifold 30. Being pivotally connected at their opposed ends to manifold 30 and concentric with axle 51, said struts permit stand 50 to be raised off the manhole floor when desired to center the pull line feeding guide eye 57 of said stand with manifold 30. The second one of said struts 80 by reason of its detachable connection to axle 51 also serves in cooperation with washer 53 and keeper 54 to retain reel 50 in place on axle 51 and against shifting axially thereof.

Referring now more specifically to the reel brake 60 as it is illustrated in FIG. 12, it will be seen that its second brake element 62 includes a pair of arcuate brake shoes 65 which are located inwardly of the arcuate sleeve portion 66 of the first brake element 61 and normally out of engagement therewith so that the first brake element is free to rotate with the reel. On their innerside, said brake shoes 65 each have a right-angled rigidly fixed actuatable portion 67 having their respective upper and lower ends connected by a pair of springs 68 which are tensioned to retain the shoes 65 normally out of frictional engagement with arcuate sleeves 66 as aforementioned. Still referring to FIG. 12, it will be seen that the lower ends of said actuating portions 67 of the brake shoes are notched so that they engage and are retained by headed pin 69 to permit relative pivotal sliding movement on disk 64. The upper ends of the actuating portions 67 of said shoes 65 in turn are received within aligned slots 70 of a cube-shaped actuating member 71 fixed at one end to a shaft 72 to which an actuating handle 73 is fixed by member 74. It will be appreciated that by manually pulling or pushing on handle 73 actuator 71 is rotated against spring 68 to effectively spread at least the upper portions of the brake shoes 65 further apart as their lower ends pivot about pin 69, thereby applying frictional resistance against the underside of sleeve portions 66 of the first brake element 61. Actuation of handle 74 thus serves to retard rotation of the reel on axle 51 and the tension thereby applied against the pull lines *x* as they unwind from the reel R is a product of the angle through which the handle is moved.

Thus it will be seen that the described apparatus facilitates rapid advance of the carriers 20 and the pull lines *x* attached thereto through the respective passages *k* in the conduit to its exit end at the second manhole by building air pressure in a confined but expanding air chamber between the manifold 30 and the carrier 20. In experiments conducted to date it has been found that the carriers can be simultaneously driven through the passages of conduits some seven or eight hundred feet long in a matter of minutes utilizing compressors capable of delivering about 270 cubic feet per minute and an air pressure of 3.0 to 3.5 pounds per square inch.

By manually pulling on handle 74, the operator is able to vary the tension applied to the unwinding pull lines so that the foam carriers 20 remain in phase, that is to say, the carriers remain in the overlapping relation illustrated by FIG. 1 and one carrier is not allowed to lag or lead the others as illustrated in FIG. 2 so as to dilute the force of the air being directed into the manifold. In the event one or more of the carriers meets an obstruction or is otherwise slowed down, the operator is made immediately aware thereof by a noticable slackening of the pull line connected to the lagging carrier. This can be quickly compensated by the operator pulling harder on the brake handle 74 to increase the retarding tension on the pull lines and thereby to slow down the carriers and allow the lagging carrier to catch up and/or holding or pulling back on the taut lines to bring the carriers 20 back into phase.

In the experiments conducted to date, it has been found that presence of water in the conduit passages $k$ does not present a problem. In fact, it has been found that the water tends to lubricate the advance of the foam carriers through the passages $k$ and to increase their effectiveness in sealing the driving air chamber. A steady breaking pressure on the pull line reel has been most effective to prevent the carriers from lagging and eventually stalling. It has also been found particularly advantageous to operation of the apparatus that the pull lines be wound on the reel by machine to assure maintenance of an even tension on each line as well as a uniformity of the wound spool. The pull lines should also be wound side by side with a uniform spiral pitch of the entire aligning group to prevent individual pull lines from being pulled down into the other lines, thus causing binding.

From the aforesaid description of a preferred apparatus and method of utilizing the same, it now will be appreciated that all the recited objects, advantages and features of the invention have been demonstrated as obtainable in a highly practical and efficient, economical manner.

Having described the invention, what is claimed is:

1. Pneumatic rodding apparatus for driving cable pull lines through multi-passage conduits having communicating gaps between passages at intervals along the length thereof, said apparatus including shaped carriers for insertion within each said passages and having means to which the end of cable pull lines are attached, a manifold for closing the entrant end of the conduit, the exit end of the conduit being left open, the manifold having a first set of openings which communicate with said conduit passages and a further set of smaller sized openings through which the pull lines feed to the first set of openings, a stand for rotatably supporting a reel on which the pull lines are uniformly wound in side by side relation, means for blowing air into the manifold to simultaneously drive the carriers through the conduit passages, and braking means for tensioning the pull lines as they unwind from the reel so that the carriers advance in unison as they are driven through the conduit passages to the exit end of the conduit.

2. Pneumatic rodding apparatus as claimed in claim 1 wherein the carriers comprise foam plastic memebers shaped to have peripheral sliding contact with the sidewalls of the passages into which they are inserted.

3. Pneumatic rodding apparatus as claimed in claim 2 wherein the carriers comprise a sandwich of sheet foam plastic portions, interior ones of which have a smaller cross section than the outer portions providing clearance spaces thereabout between the outer sheet foam plastic portions which have peripheral sliding contact with the passage sidewalls.

4. Pneumatic rodding apparatus as claimed in claim 3 wherein the carriers have a washer at each end of the sandwiched sheet plastic foam portions and a connector extending through said washers and sheet plastic foam portions securing the same unitary structure, said connector including an eye portion at one end constituting means to which the pull lines are attached.

5. Pneumatic rodding apparatus as claimed in claim 1 wherein the braking means acts on the reel for retarding reel rotation and thereby placing tension on the pull lines as they unwind from the reel in response to advance of the carriers.

6. Pneumatic rodding apparatus as claimed in claim 5 wherein the stand includes an axle on which the reel is detachably mounted for rotation, and a keeper for retaining the reel on the axle, the brake means including a first member having portions interengaging with the reel when assembled on the axle, a second member adapted for frictional engagement with the first member and manually operable means for effecting frictional engagement of the second member with the first member.

7. Pneumatic rodding apparatus as claimed in claim 5 having locating means for fixing said axle of the reel stand at a finite distance from the manifold.

8. Pneumatic rodding apparatus as claimed in claim 7 wherein the locating means comprise strut members fixed between the reel stand and the manifold.

9. Pneumatic rodding apparatus for installing cable pull lines in multi-passage conduits embodying joined sections having air gaps between passages at the conduit section joints, the apparatus comprising foam carriers for insertion into each of the passages, said foam carriers having sliding peripheral contact with the inferior surface of the respective passages into which they are inserted and having means to which the free end of cable pull lines wound on a reel may be attached, a manifold which mounts air tight over the entrant end of the joined conduit sections, said manifold having a first set of openings which align with respective passages of said conduit sections when mounted over said entrant end and a second set of smaller openings aligned with the openings of the first set and through which aligned openings pull lines connected to the foam carriers extend, a stand on which the pull line reel is rotatably mountable, means rigidly locating the rotational axis of the reel at a fixed distance from the manifold when mounted on said stand, air blower means communicating with said manifold for forcing air under pressure through said manifold into each of the conduit passages behind the foam carrier when inserted therein to simultaneously drive the carriers to the open opposite end of the conduit sections, and braking means for asserting resisting tension on the reel and thereby the unwinding pull lines such that the foam carriers remain in phase under the driving force of the air blower means to avoid air by-passing the carriers through the air gaps to the conduit exit end with accompanying loss of driving pressure.

10. Method of pneumatically rodding cable pull lines through multi-passage conduit having air gaps at the juncture of the passage-defining partition walls of the sections which embody the conduit, comprising the steps of inserting carriers into the entrant end of each of the conduit passages which carriers have the free end of pull lines wound on a reel attached thereto, the exit end of the conduit being left open, and blowing air into the entrant end of the conduit to simultaneously advance each carrier through its passage to the conduit exit end, and applying tension to the pull lines as they unwind from the reel so that the carriers advance in unison and and prevent air bypassing the carriers through the air gaps at the juncture of the conduit sections.

11. Method according to claime 10 wherein the carriers have yielding fit with all sides of the passages through which they are advanced.

12. Method according to claim 11 wherein the entrant end of the conduit is closed air-tight other than for openings through which the pull lines feed.

13. Method according to claim 10 wherein tension is applied to the unwinding pull lines by manually retarding rotation of the reel on which the pull lines are wound.

14. Method of pneumatically rodding telephone cable pull lines and the like through the open ended passages of end-joined multi-passage conduit sections which are incompletely sealed such that air gaps exist between individual passages at the conduit section joints, the method comprising the steps of:
 a. at the entrant end of said joined conduit sections, rotatably supporting a reel containing the pull lines which are uniformly wound side to side thereon at a uniform spiral pitch;
 b. passing the free end of the pull lines through provided openings therefor in a manifold which align with said passages when the manifold is assembled over the one end of said conduit sections;
 c. attaching each pull line to foam carriers adapted to have sliding contact with the inner periphery of said passages;
 d. inserting each said foam carriers into a respective one of the passages with which it is adapted to have siding peripheral contact;
 e. mounting the manifold air-tight over said entrant end of the joined conduit sections;
 f. forcing air under pressure through said manifold into each of the conduit passages behind the foam carriers inserted therein to simultaneously drive said carriers toward the open opposite end of the joined conduit sections;
 g. the pull lines uniformly unwinding from the reel as the foam carriers are driven through the respective passages; and
 h. maintaining tension on the pull lines as they unwind from the reel such that the foam carriers remain in phase and one or more carriers does not unduly lag permitting other carriers to precede the former and allow air to bypass the foam carriers by escaping through the air gaps to the open exit end of the joined conduit sections with drop in driving pressure.

* * * * *